(12) United States Patent
Siebels et al.

(10) Patent No.: US 8,284,542 B2
(45) Date of Patent: Oct. 9, 2012

(54) CIRCUIT BREAKER WITH IMPROVED TIE-DOWN ACCESSORY

(75) Inventors: Randy L. Siebels, Cedar Rapids, IA (US); William J. Broghammer, Cedar Rapids, IA (US)

(73) Assignee: Schneider Electric USA, Inc., Palatine, IL (US)

( * ) Notice: Subject to any disclaimer, the term of this patent is extended or adjusted under 35 U.S.C. 154(b) by 203 days.

(21) Appl. No.: 12/719,922

(22) Filed: Mar. 9, 2010

(65) Prior Publication Data

US 2011/0222211 A1    Sep. 15, 2011

(51) Int. Cl.
*H02B 1/04* (2006.01)
*H02B 1/20* (2006.01)
*H02B 1/01* (2006.01)
*H02B 1/015* (2006.01)

(52) U.S. Cl. ........ 361/634; 361/673; 361/652; 361/656; 361/627

(58) Field of Classification Search .................. 361/634, 361/673, 652, 656, 622, 627, 636, 644
See application file for complete search history.

(56) References Cited

U.S. PATENT DOCUMENTS

| | | | | |
|---|---|---|---|---|
| 3,398,249 A * | 8/1968 | Dessert | ........................ | 200/294 |
| 4,454,565 A * | 6/1984 | Krasij et al. | .................. | 361/673 |
| 4,733,029 A * | 3/1988 | Kobayashi et al. | ........ | 200/43.15 |
| 4,754,247 A * | 6/1988 | Raymont et al. | .............. | 335/202 |
| 4,982,173 A * | 1/1991 | Meiners et al. | .................. | 335/21 |
| 5,107,396 A * | 4/1992 | Rosen et al. | .................... | 361/637 |
| 5,113,043 A * | 5/1992 | Morris | ........................ | 200/43.01 |
| 5,126,918 A * | 6/1992 | Morby et al. | ................. | 361/644 |
| 5,172,300 A * | 12/1992 | Morby et al. | ................. | 361/637 |
| 5,349,145 A * | 9/1994 | Kelaita et al. | ............. | 200/43.15 |
| 5,467,622 A * | 11/1995 | Becker et al. | .................. | 70/203 |
| 5,775,481 A | 7/1998 | Lyke | ......................... | 200/43.22 |

(Continued)

OTHER PUBLICATIONS

Square D "QO1PAF and QOU1PAFLA Handle Lock-off Padlock Attachment Kits" Instruction Bulletin 48840-209-01 Issued 2000 (4 pages).

(Continued)

*Primary Examiner* — Bradley Thomas
(74) *Attorney, Agent, or Firm* — Nixon Peabody LLP

(57) ABSTRACT

Electrical circuit breakers in an electrical panelboard are equipped with tie-down devices to secure the circuit breakers to the panelboard. Each circuit breaker includes a standard housing or case having a raised portion that forms a pair of end walls and a slot at the base of each of the end walls. The panelboard includes mounts for attaching the tie-down devices to the panelboard. Each tie-down device includes (1) a breaker-attachment portion adapted to be mounted on the circuit breaker housing around the raised portion and having a pair of mounting hooks adapted to fit into the slots for attaching the tie-down device to the circuit breaker housing, and (2) a panelboard attachment portion extending beyond the circuit breaker housing for attachment to the panelboard mount.

20 Claims, 2 Drawing Sheets

U.S. PATENT DOCUMENTS

| | | | | |
|---|---|---|---|---|
| 5,817,998 | A | 10/1998 | Siebels et al. | 200/43.14 |
| 5,906,462 | A * | 5/1999 | Bergman | 411/43 |
| 5,909,019 | A * | 6/1999 | Maloney et al. | 200/43.14 |
| 6,062,914 | A * | 5/2000 | Fasano | 439/716 |
| 6,396,008 | B1 | 5/2002 | Maloney et al. | 200/43.14 |
| 6,806,799 | B2 * | 10/2004 | Runyan | 335/6 |
| 6,940,027 | B1 | 9/2005 | Sipe | 200/43.14 |
| 7,286,340 | B2 * | 10/2007 | Karim et al. | 361/647 |
| 7,403,373 | B2 * | 7/2008 | McCoy et al. | 361/673 |
| 2006/0285281 | A1 * | 12/2006 | Zhang et al. | 361/659 |
| 2008/0277250 | A1 * | 11/2008 | DeCook et al. | 200/43.14 |
| 2008/0284614 | A1 * | 11/2008 | Perez et al. | 340/870.02 |

OTHER PUBLICATIONS

International Search Report for International Application No. PCT/US2011/027191, dated Aug. 17, 2011 (4 pages).

Written Opinion of the International Searching Authority for International Application No. PCT/US/2011/027191, dated Aug. 17, 2011 (5 pages).

Layer Zero Power Systems, Inc.: SafePanel Panel Board, dated Jan. 27, 2011, 3 pages.

* cited by examiner

CIRCUIT BREAKER WITH IMPROVED TIE-DOWN ACCESSORY

FIELD OF THE INVENTION

The present invention relates to a circuit breaker tie-down accessory that provides the function of securing a circuit breaker to a panelboard in a simple, quick operation that does not require removal of the circuit breaker.

BACKGROUND OF THE INVENTION

In electrical panelboards containing circuit breakers, it is sometimes desirable to secure the circuit breakers to the panelboard so that the circuit breakers cannot be removed or even loosened to cause an interruption in the electrical power being supplied to critical equipment, such as the equipment in a data center. It is particularly desirable to permit the circuit breakers to be secured to the panelboard without the need to order special circuit breakers for that purpose, i.e., to permit virtually any standard circuit breaker to be secured to the panelboard. When the circuit breakers have already been installed, it is desirable to be able to secure the breakers to the panelboard without removing the circuit breakers, without requiring any special tools, and using a procedure that is safe for the installing personnel.

SUMMARY

According to one embodiment, electrical circuit breakers in an electrical panelboard are equipped with tie-down devices to secure the circuit breakers to the panelboard. Each circuit breaker includes a standard housing (often referred to in the industry as a "case") having a raised portion that forms a pair of end walls and a slot at the base of each of the end walls. The panelboard includes mounts for attaching the tie-down devices to the panelboard. Each tie-down device includes (1) a breaker-attachment portion adapted to be mounted on the circuit breaker housing around the raised portion and having a pair of mounting hooks adapted to fit into the slots for attaching the tie-down device to the circuit breaker housing, and (2) a panelboard-attachment portion extending beyond the circuit breaker housing for attachment to a panelboard mount.

In one implementation, the panelboard mounts are electrically non-conductive to avoid any current path between the panelboard and the tool used to attach the tie-down device to the mount, and each of the tie-down devices is a single unitary structure, formed from a single piece of metal. The top surface of said raised portion of each circuit breaker housing is substantially unobstructed by said tie-down device attached to that circuit breaker housing.

The tie-down device secures the circuit breakers to the panelboard so that the circuit breakers cannot be removed or even loosened to cause an interruption in the electrical power being supplied to critical equipment, such as the equipment in a data center. The tie-down device enables the circuit breakers to be secured to the panelboard without the need to order special circuit breakers for that purpose, permitting virtually any standard circuit breaker to be secured to a panelboard. When the circuit breakers have already been installed, the breakers can be secured to the panelboard without removing the circuit breakers, without requiring any special tools, and using a procedure that is safe for the installing personnel.

The foregoing and additional aspects of the present invention will be apparent to those of ordinary skill in the art in view of the detailed description of various embodiments, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

FIG. 2 is the same perspective view shown in FIG. 1 but with the tie-down device locked to the circuit breaker and the mount, and illustrating a portion of a tool used to lock the tie-down device to the circuit breaker.

Figure 1:
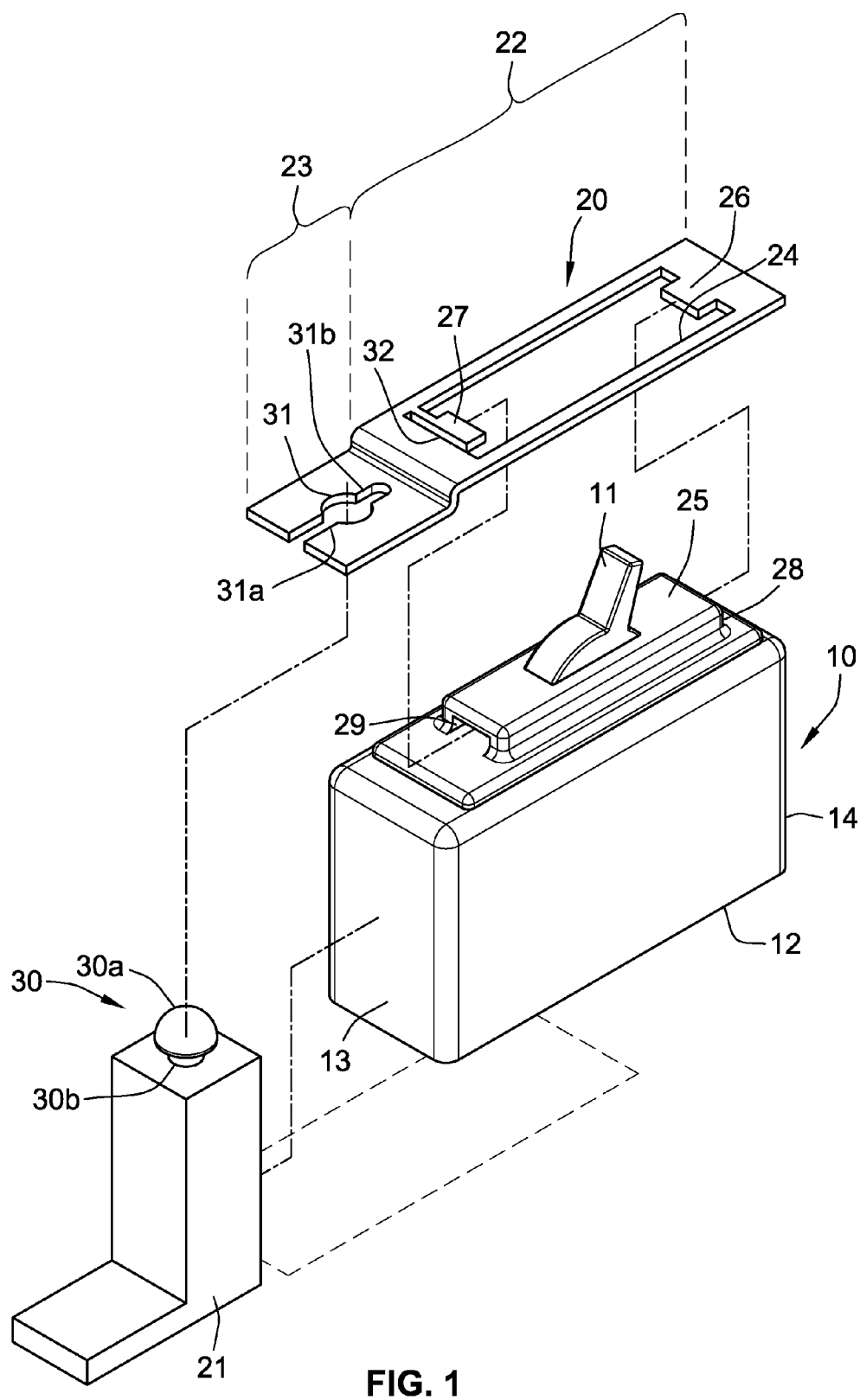
FIG. 1 is an exploded perspective view of a circuit breaker, a panelboard mount and a tie-down device for securing the circuit breaker to the mount.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

Turning now to the drawings, a circuit breaker 10 has a movable handle 11 extending outwardly from a molded plastic housing 12. The power distribution circuit controlled by the breaker 10 is connected to "line" and "load" terminals accessible in opposite end portions 13 and 14 of the breaker housing 12. The power circuit is closed when the breaker is "on" and open when the breaker is "off." To prevent inadvertent or unauthorized removal or loosening of the breaker after it has been installed, e.g., in a panelboard, a tie-down device secures the breaker in its installed position.

In the illustrative embodiment, the tie-down device 20 attaches the circuit breaker 10 to a panelboard mount 21. The tie-down device 20 is formed from a single unitary strip of metal that forms an elongated breaker-attachment portion 22 and a panelboard-attachment end portion 23. The breaker-attachment portion 22 forms a generally rectangular opening 24 that is only slightly larger than the dimensions of a raised upper portion 25 of the circuit breaker 10, so that the tie-down device can be applied over the raised portion 25. First and second tabs 26 and 27 are formed at opposite ends of the window 24 for securing the tie-down device 20 to the circuit breaker 10 by fitting into slots 28 and 29 formed at the bases of the end walls of the raised portion 25 of the breaker.

Figure 2:
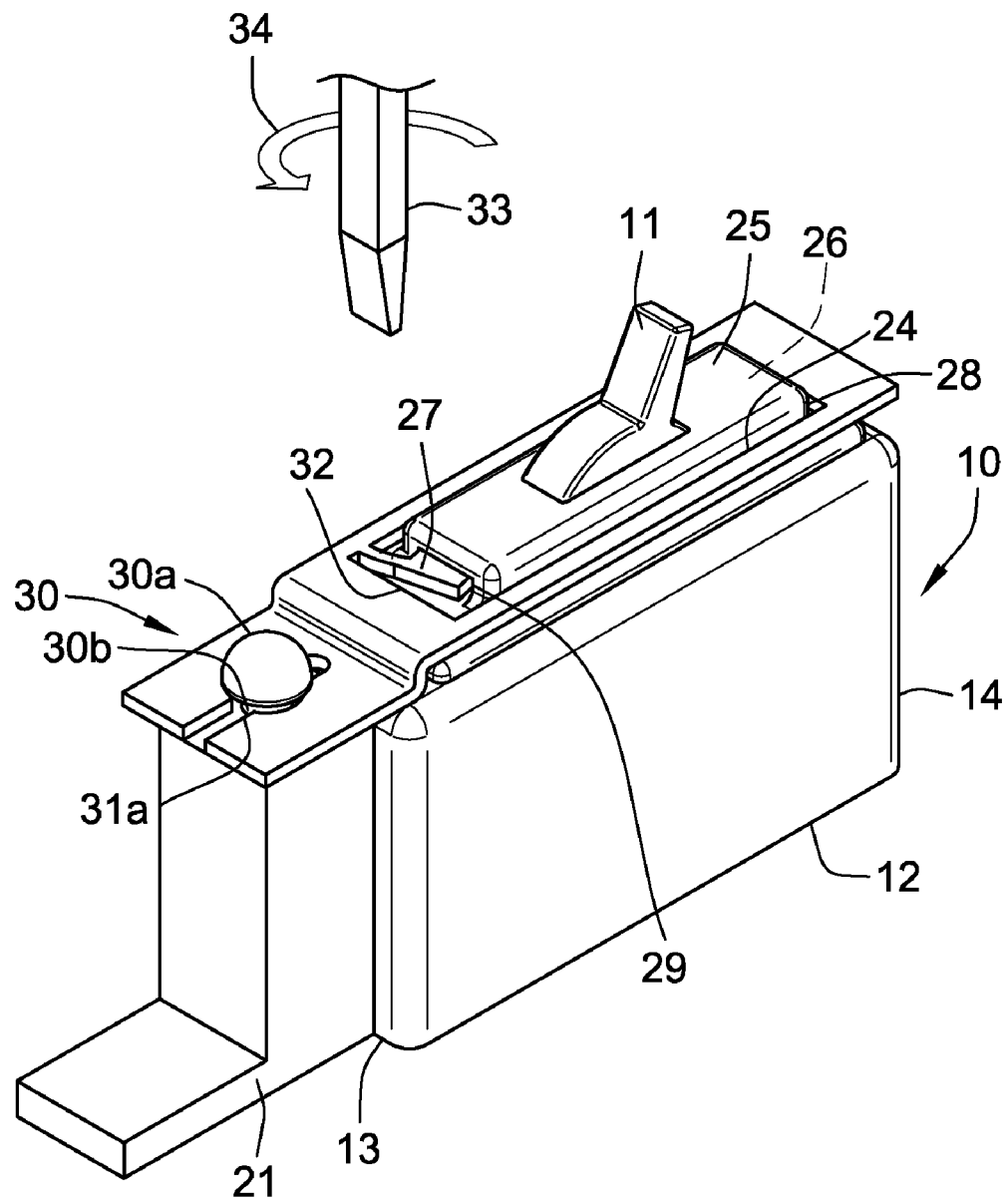
FIG. 2 is an exploded version of the perspective view shown in FIG. 1.

To install the tie-down device 20 on the circuit breaker 10, the right-hand end of the device, as viewed in FIG. 1, is tilted downwardly over the right-hand end of the raised portion 25 to align the tab 26 with the slot 28. The device 20 is then pulled to the left to draw the tab 26 into the slot 28, and the left-hand of the device is lowered to align the tab 27 with the slot 29 in the left-hand end wall of the raised portion 25 of the circuit breaker. It will be noted that the tie-down device 20 forms a slot 32 behind the tab 27, to enable the tab 27 to be bent into the breaker slot 29, thereby locking the device 20 securely to the breaker, as shown in FIG. 2. The bending of the tab 27 into the slot 29 can be easily effected with a screwdriver 33, as depicted in FIG. 2, by simply inserting the tip of the screwdriver 33 into the slot 32 and then twisting the screwdriver in the direction of the arrow 34 to bend the tab 27 into the slot 29. This completes the locking of the tie-down device 20 to the circuit breaker, with tabs 26 and 27 inserted in their respective slots 28 and 29 in both ends of the raised portion 25.

To install the tie-down device 20 on the panelboard mount 21, the panelboard-attachment end portion 23 of the device 20 is lowered into engagement with a fastener 30 extending upwardly from the top of the panelboard mount 21. The portion of the tie-down device 20 that engages the fastener 30 forms a hole 31 that is concentric with the fastener 30. The diameter of the hole 31 is smaller than the maximum diameter of the fastener 30, so that the device 20 can be attached to the mount 21 by simply pressing the end portion 23 of the device 20 downwardly against the fastener 30. The fastener 30 forms a mushroom-shaped head 30a on top of a stem 30b so that as the device 20 is pressed downwardly against the fastener 30, the rounded surface of the head 30a deflects the edge of the hole 31 upwardly to temporarily increase the diameter of the hole 31. This allows the end portion 23 of the tie-down device 20 to slide downwardly over the head 30a and then snap into place beneath the head 30a. The panelboard-attachment end portion 23 of the tie-down device 20 is thus captured beneath the lower surface of the mushroom-shaped head 30a, thereby locking the tie-down device 20 to the mount 21. To facilitate the deflection of the edge of the hole 31 as it is pressed downwardly against the fastener 30, a pair of slots 31a and 31b are formed on opposite sides of the hole 31, with the outer slot 31a extending through the end of the device 20.

It can be seen that the tie-down device 20 does not obstruct any portion of the top surface of the raised portion 25 of the circuit breaker 10 so that printed information that is provided on that top surface can be readily seen by customers and users. Printed indicia such as amperage ratings are typically provided on that top surface, where such indicia will be readily viewable by the user. The breaker-attachment portion 22 of the tie-down device 20 rests on the top surface of the circuit breaker surrounding the raised portion 25. Nor does the tie-down device 20 interfere with movement of the handle 11 of the circuit breaker 10. The tie-down device 20 holds the circuit breaker firmly in place on the panelboard, resisting forces that might tend to remove or loosen the breaker.

The panelboard mount 21 is preferably made of an electrically non-conductive material to ensure the safety of the installer while attaching the tie-down device to the panelboard. A non-conductive mount 21 avoids any current path between the panelboard and the tool used to attach the tie-down device to the mount. The non-conductive mounts can be included as integral parts of the panelboard as originally manufactured, or can be retrofitted to existing panelboards, including panelboards already installed, using simple fastening screws threaded into the base of the mount.

As can be seen from the foregoing description, the tie-down device 20 is used to secure circuit breakers to a panelboard so that the circuit breakers cannot be removed or even loosened to cause an interruption in the electrical power being supplied to critical equipment, such as the equipment in a data center. The tie-down device enables the circuit breakers to be secured to the panelboard without the need to order special circuit breakers for that purpose, permitting virtually any standard circuit breaker to be secured to a panelboard. When the circuit breakers have already been installed, the breakers can be secured to the panelboard without removing the circuit breakers, without requiring any special tools, and using a procedure that is safe for the installing personnel.

While the present invention has been described with reference to one or more particular embodiments, those skilled in the art will recognize that many changes may be made thereto without departing from the spirit and scope of the present invention. For example, the tie-down device may be designed for attachment to the panelboard mount by different types of fasteners, such as a screw or other types of snap-fit fasteners. Also, the tie-down device may be made of a polymeric material rather than metal. Each of these embodiments and obvious variations thereof is contemplated as falling within the spirit and scope of the claimed invention, which is set forth in the following claims.

The invention claimed is:

1. An electrical panelboard containing one or more electrical circuit breakers equipped with one or more tie-down devices to secure the circuit breakers to the panelboard, each of the circuit breakers including a housing having a raised portion that forms a top surface extending between a pair of end walls and a respective slot at the base of each of said end walls, and said panelboard including one or more mounts for attaching said tie-down devices to said panelboard, each of said mounts including a fastener with a rounded head attached to a stem, each of said tie-down devices comprising:
   a breaker-attachment portion adapted to be mounted on the circuit breaker housing around said raised portion such that the top surface of said raised portion of the circuit breaker housing is unobstructed by said tie-down device, said breaker-attachment portion having a pair of mounting hooks that fit into said slots of said raised portion to thereby attach said tie-down device to said circuit breaker housing, and
   a panelboard attachment portion extending beyond said circuit breaker housing and adapted to attach to said panelboard mount, said panelboard attachment portion including a hole with one or more slots extending from the hole such that the hole expands when pressed concentrically onto said rounded head of said fastener and then contracts so that said panelboard attachment portion attaches to said mount beneath said rounded head and adjacent said stem.

2. The electrical panelboard of claim 1 in which said panelboard mounts are electrically non-conductive.

3. The electrical panelboard of claim 1 in which each of said tie-down devices is a single unitary structure.

4. The electrical panelboard of claim 1 in which each of said tie-down devices is formed from a single piece of metal.

5. The electrical panelboard of claim 1 in which said breaker-attachment portion includes a window configured to fit around said raised portion of said circuit breaker.

6. The electrical panelboard of claim 5 in which said raised portion forms a pair of side walls extending between and connecting said pair of end walls, said window extending continuously around said sidewalls and said end walls to thereby fit said breaker-attachment portion around said raised portion.

7. The electrical panelboard of claim 5 in which said pair of mounting hooks includes first and second tabs projecting inwardly from opposite ends of said window.

8. The electrical panelboard of claim 7 in which said second tab is configured to bend inwardly toward said first tab.

9. A panelboard circuit breaker assembly comprising:
   a panelboard adapted to receive circuit breakers,
   a plurality of panelboard mounts positioned to be adjacent circuit breakers received on said panelboard, each of said panelboard mounts including a fastener with a head projecting from a stem;
   a plurality of circuit breakers on said panelboard, each circuit breaker including a housing having a raised portion that forms a top surface extending between a pair of end walls and a respective slot at the base of each of said end walls, and a plurality of tie-down devices, each of said tie-down devices including:
- a breaker-attachment portion mounted on the circuit breaker housing around said raised portion such that the top surface of said raised portion of the circuit breaker housing is unobstructed by said tie-down device, the breaker-attachment portion having a pair of mounting hooks fit into said slots of said raised portion thereby attaching said tie-down device to said circuit breaker housing, and
- a panelboard attachment portion extending beyond said circuit breaker housing and attached to one of said panelboard mounts, said panelboard attachment portion including a hole fit around the stem of the fastener and one or more slots extending from the hole such that the edge of the hole deflects outwardly as the hole is pressed concentrically over the head of the fastener.

10. The panelboard assembly of claim 9 in which said panelboard mounts are electrically non-conductive.

11. The panelboard assembly of claim 9 in which each of said tie-down devices is a single unitary structure.

12. The panelboard assembly of claim 9 in which said each of said tie-down devices is formed from a single piece of metal.

13. The panelboard assembly of claim 9 in which said head has a first diameter and said stem has a second diameter less than the first diameter.

14. The panelboard assembly of claim 13 in which said hole has a third diameter less than the first diameter of the head and greater than the second diameter of the stem of the fastener.

15. The panelboard assembly of claim 9 in which said hole is generally concentric with the stem of the fastener.

16. The panelboard assembly of claim 9 in which said breaker-attachment portion of said tie-down device includes a window fit around said raised portion of said circuit breaker.

17. The panelboard assembly of claim 16 in which said raised portion forms a pair of side walls extending between and connecting said pair of end walls, said window extending continuously around said sidewalls and said end walls to thereby fit said breaker-attachment portion around said raised portion.

18. The panelboard assembly of claim 16 in which said pair of mounting hooks includes first and second tabs projecting inwardly from opposite ends of said window, said second tab being bent inwardly toward said first tab.

19. A tie-down device for securing a circuit breaker to a panelboard mount, said circuit breaker having a housing with a raised portion that forms a top surface extending between a pair of end walls and a respective slot at the base of each of said end walls, and said panelboard mount including a fastener having a mushroom-shaped head, said tie-down device comprising:
- a breaker-attachment portion adapted to be mounted on the circuit breaker housing around said raised portion such that the top surface of said raised portion of the circuit breaker housing is unobstructed by said tie-down device, the breaker-attachment portion having a pair of mounting hooks adapted to fit into said slots of said raised portion to thereby attach said tie-down device to said circuit breaker housing, and
- a panelboard-attachment end portion extending beyond said circuit breaker housing and adapted to attach to said panelboard mount, said panelboard-attachment end portion including an aperture with resilient edges configured to permit said aperture to be enlarged to pass over said mushroom-shaped head and then return to a normal size so that said panelboard-attachment end portion is captured below said mushroom-shaped head.

20. The tie-down device of claim 19 in which said mushroom-shaped head is semispherical, and said resilient edges permit said aperture to be enlarged to pass concentrically over said semispherical mushroom-shaped head.

* * * * *